Sept. 23, 1969  J. E. HARDER  3,469,146

SUBMERSIBLE LIGHTNING ARRESTER FOR CABLE CIRCUITS

Filed Sept. 8, 1967

United States Patent Office 3,469,146
Patented Sept. 23, 1969

3,469,146
SUBMERSIBLE LIGHTNING ARRESTER FOR CABLE CIRCUITS
John E. Harder, Bloomington, Ind., assignor to Westinghouse Electric Corporation, Pittsburgh, Pa., a corporation of Pennsylvania
Filed Sept. 8, 1967, Ser. No. 666,386
Int. Cl. H02h 1/04, 3/22
U.S. Cl. 317—61      5 Claims

ABSTRACT OF THE DISCLOSURE

A lightning arrester having its components sealed in a conductive, preferably metal, container. The components are stacked in the radial center of the container so that an insulating column of air or gas surrounds the components and isolates them from the container side walls. The container is grounded when installed, and has a connecting means in one end of the container for connecting the arrester components to an external circuit, for example to a distribution transformer connected in an underground cable circuit.

BACKGROUND OF THE INVENTION

Figure 1:
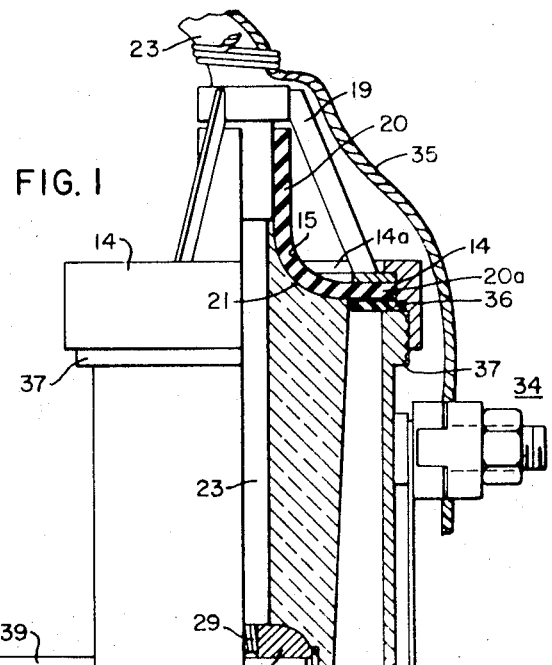

The present invention relates generally to lightning arresters, and particularly to a lightning arrester for underground distribution systems though the invention is not limited thereto.

Generally, power cable circuits with a concentric neutral conductor are not subject to induced overvoltages. However, high frequency overvoltages impressed on a system at the transition location between an above ground (i.e. pole supported) open wire line and an underground cable circuit are reflected and increased in magnitude upon reaching an open end or high surge impedance point in the cable circuit. Such an open end or high surge impedance point would include the end of a cable circuit extending underground into say a residential area from the main (and above ground) distribution line. Even when lightning or overvoltage protection is provided at the source terminals of the cable circuit (i.e. an arrester mounted on the transition pole), dangerous overvoltages in the cable are possible since such protection is not located at the open end where the overvoltage is increased and reflected.

When overvoltage and lightning protection are contemplated for the end of an underground feeder or cable, the possibility arises that the protective device employed may be submersed in conductive and corrosive water, and that when this does occur, it will have to function properly in such a liquid environment.

Heretofore, the solutions to these problems have been limited in their application or uneconomical or both. In a pad mounted transformer, where there is no danger of submersion in liquid (conductive, corrosive or otherwise), since the transformer is mounted on a cement pad above ground level, an ordinary distribution arrester can be conveniently used on a terminal of the transformer. However, where there is the possibility of submersion, as with vault mounted transformers disposed in the ground, the solutions to the cable circuit protection problem are not as simple as that of the pad mounted transformer. One solution has been to place a lightning arrester inside the transformer which of course protects the arrester from outside submerged conditions. This provides protection for the transformer but is not needed except in the last transformer at the end of the circuit or feeder. For example, if a transformer is installed at what is presently the last point on the circuit, an arrester is required. However, when the circuit is later extended, in say a growing residential area, the arrester within the transformer is no longer required but would probably be left in the transformer because of the difficulty involved in removing it.

Another solution to the problem has been to mount an arrester on the outside of an underground transformer using an insulating shield or hood over one end of the arrester. The shield prevents the flow of power current through conductive water should the transformer containing vault become submerged and filled with water. This construction makes the arrester available for easy removal for circuit expansion or other reasons but does not isolate the arrester from the electrical influence of the surrounding conductive liquid.

BRIEF SUMMARY OF THE INVENTION

The present invention provides a solution to the cable circuit protection problem that is both economical and flexible, allowing easy installation and removal of a lightning arrester unit for movement from open point to open point in a cable circuit while simultaneously providing a safe, grounded and shielded construction unaffected by conductive and corrosive liquids. This is accomplished by a novel lightning arrester construction in which a sealed, electrically conductive container is provided to house and shield the components of a lightning arrester. The components are disposed and held in the center of the container so that an annular or cylindrical column of air or gas surrounds the components and thereby insulates the components from the container wall. The container is completely grounded when the arrester unit is installed. In small transformer vaults for residential distribution systems, this is particularly important; the grounded external container of the arrester assures that physical contact therewith by workmen will not result in electrical shock. The grounded conductive container and the annular column of air around the components within the container completely isolates and insulates the arrester components from any conductive liqiuid. In addition, the column of air provides thorough line to ground separation.

A connecting cable may be provided in which one end thereof extends into the container for electrical connection to the arrester components, preferably through an electrically terminating entrance bushing and stress cone though the invention is not limited thereto.

THE DRAWING

Figure 2:
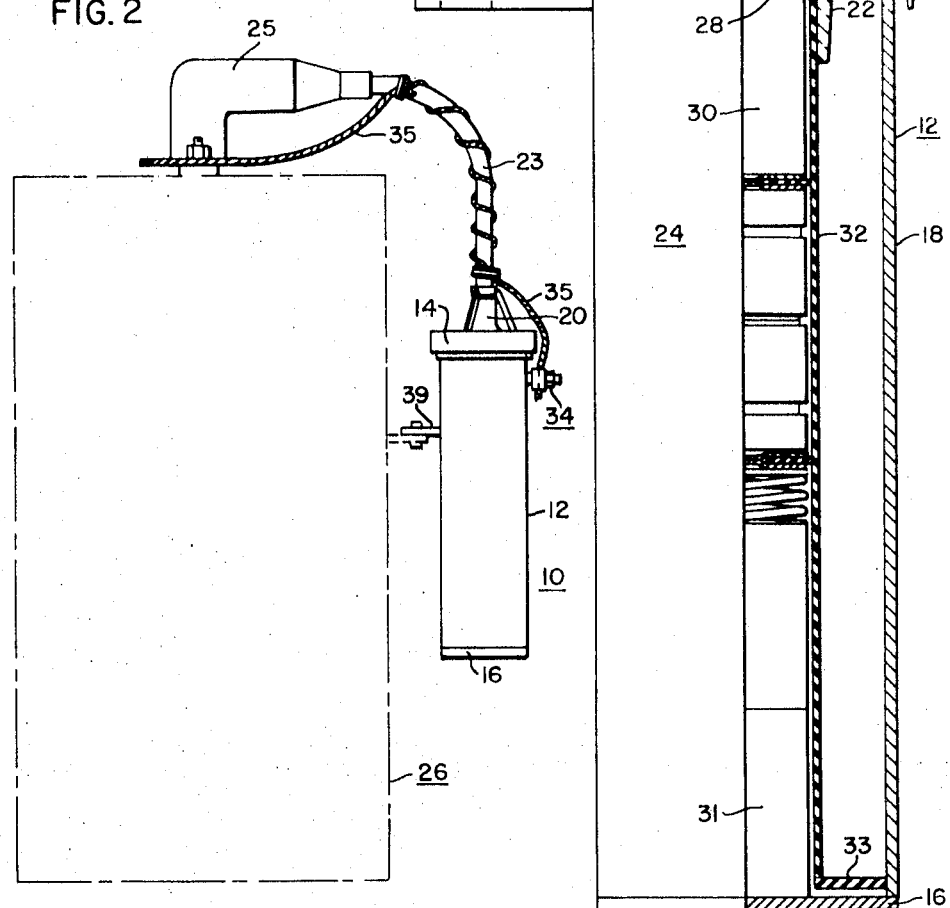

The objects and advantages of the invention will be more apparent from reading the following detailed description in connection with the accompanying drawing in which:

FIGURE 1 is an open side view of a lightning arrester constructed in accordance with the principles of the present invention; and FIGURE 2 is a view of the arrester of FIG. 1 connected in service.

PREFERRED EMBODIMENT

Specifically, there is shown in FIG. 1 a sealed lightning arrester unit generally designated 10 constructed in accordance with the principles of the invention. The arrester 10 comprises a conductive, preferably metal, can or container 12 having top and bottom (end) wall portions 14 and 16, respectively, and a preferably cylindrical side wall 18 though the invention is not limited thereto. The bottom wall portion 16 may be integrally formed with the side wall 18, or the wall portions may be separately fabricated and welded or otherwise fixed together to form a sealed container and shield. In the figures, the top wall portion 14 is shown as a screw-on lid or cover means threadedly engageable with an end portion of the side wall 18.

The lid 14 is provided with an opening 15 which is occupied by a cable support structure 19, a stress cone 20 and a hollow insulating bushing 22 which extends between the lid and a stack of lightning arrester components generally designated 24.

The stress cone 20 and the bushing 22 are preferably made to form a unitary structure for disposition and sealing in the opening of the lid portion 14. The stress cone, however, is electrically conductive, and may be made from carbon-granule impregnated rubber material though the invention is not limited thereto. The conductive cone and the insulating bushing 22 are provided with outwardly curving mating surfaces which, when joined together, form an electrical terminating surface 21 which functions to control the electrical stress in the cable and bushing insulation, preventing locally highly stressed regions.

The curved structure of the stress cone 20 extends outwardly beyond the insulating bushing 22 to form an annular flange portion 20a which is secured in the lid 14 beneath the cable support structure 19.

The cable support structure 19 and the cone-bushing termination (20–22) may be sealed and secured in the lid 14 by a potting compound or resin poured in an open area 14a in the lid above the flange portion 20a of the cone.

The stress cone 20 and the insulating bushing 22 concentrically support the connecting cable 23 in the lid 14 and container 12. The cable has one end disposed in electrical connection with the arrester component stack 24 and the other end (FIG. 2) having a connector 25 suitably connected to a terminal of a transformer 26 (only representatively shown) connected in the end of an underground cable circuit (not shown).

In FIG. 1, the cable 23 is shown connected to the component stack 24 through a metal washer 28 suitably fixed to the bared ends of a wire strand 29 forming the conductive center of the cable 23. The washer 28 is disposed in physical and electrical contact with the first element of the component stack 24 which, in FIG. 1, is shown representatively as a resistive valve block 30.

As explained above, the insulating bushing 22 and the stress cone 20 function as an electrical termination for the cable 23 though the invention is not limited thereto. For example, in place of the connecting structure depicted in the figures, an electrical receptacle may be suitably disposed in the opening 15 of the lid portion 14 and properly terminated within itself. The electrical receptacle would then receive a plug means suitably connected to a cable for connecting the arrester 10 to the underground cable line. Similarly, other means than the washer 28 may be used to connect the cable 23 to the components in the stack 24.

The stack of arrester components 24 comprises well known arrester elements (i.e., non-linear resistive valve elements and spark gap means) connected in electrical series. The arrester elements are supported in an insulating tube 32 which extends between the bushing 22 and the bottom wall 16. The bushing 22 may be employed to center the component stack 24 in the container 12 as shown. Adjacent the bottom of the container is disposed another centering means in the form of an insulating spacer or washer 33.

An annular or cylindrical shaped column of air or gas is formed about the stack of components 24 by virtue of the stack being centered in the container 12 by the bushing 22 and the spacer 33. The column of air insulates and isolates the components from the container side wall 18, and provides thorough line to ground separation around the top of the component stack and the connecting washer 28.

The bottom portion of the component stack 24, which may include another (lowermost) resistive valve block 31, is in electrical contact with the conductive container 12 through its bottom wall portion 16. Upon installation of the arrester 10, the container 12 (including its bottom wall 16) is grounded so that the container functions as part of the ground terminal means for the arrester components.

A ground terminal 34, in the form of a bolt and nut means, is shown in the figures, attached to the side wall 18 of the container 12. The terminal provides a means for connecting a ground wire 35 to the container as shown. The ground wire completes the ground path for the arrester when it is connected to the system ground (FIG. 2) upon installation of the arrester unit 10 in say an underground vault (not shown). The container 12 is grounded and is therefore safe for workmen working in the vault or other areas in which the arrester unit may be located.

The sealing of the container 12 is completed when the stress cone 20 is disposed in the top of the container with its flange portion 20a disposed on a sealing washer 36 seated on the top edge of the side wall 18, and the lid means 14 is tightened against the flange portion and washer by being threaded onto an upper portion 37 of the side wall of the container 12.

The sealing structure, as described above and shown in FIG. 1, is given by way of example only, other sealing means being possible within the scope and spirit of the invention.

FIG. 2 shows the arrester unit 10 suitably mounted on the side of the transformer 26 and connected to one of its terminals. The arrester unit is mounted on the transformer by a suitably mounted means 39 provided on the outside of the container 12.

As can be readily seen, the arrester unit may be easily disconnected and removed from the transformer when the cable circuit is extended or otherwise changed which provides for an economical power system since only one arrester is required for each branch; yet the arrester, when connected in service, is completely protected from water (which can flood the vault or other means containing the arrester) by its sealed container shield 12. In addition, the container 12 is grounded so that workmen working around or with the arrester are safe, and the operation of the arrester will not be affected by the conductivity of water outside the grounded container-shield as might be the case with an unshielded construction.

What is claimed is:
1. A lightning arrester comprising
   a sealed, electrically conductive container having end and side walls, at least one of the end walls having an opening therein,
   lightning arrester components, including spark gaps and resistive devices, disposed in the radial center of the conductive container so that an insulating column of air or gas is formed around the components, said insulating column of air separating the components from the side wall of the container, and
   connecting means disposed and sealed in the opening in the end wall for electrically connecting the arrester components to an external circuit, and
   means for grounding the container walls.
2. The arrester described in claim 1 in which a hollow insulating bushing is disposed in the opening of the end wall and extends between the end wall and the arrester components,
   the connecting means including a conductor cable ex- tending through said bushing for electrical connection to the arrester components.

3. The arrester described in claim 1 in which a stress cone is disposed in the opening with the insulating bushing and around the cable.

4. The arrester described in claim 1 in which the stress cone and the insulating bushing are formed to provide an electrical termination for controlling the electrical stresses in the cable end and bushing.

5. The arrester described in claim 1 in which the end wall having the opening therein is a lid or cover means threadably engageable with an end portion of the side wall of the conductive container.

References Cited

UNITED STATES PATENTS

| | | | |
|---|---|---|---|
| 2,399,502 | 4/1946 | Olsen | 317—61 X |
| 2,947,903 | 8/1960 | Westrom | 317—61 X |
| 3,211,956 | 10/1965 | Dornbush | 317—69 X |

JOHN F. COUCH, Primary Examiner

J. D. TRAMMELL, Assistant Examiner

U.S. Cl. X.R.

317—67, 69